United States Patent [19]

Tomitaka

[11] Patent Number: 5,119,246
[45] Date of Patent: Jun. 2, 1992

[54] RF TRACKING SERVO FOR VTR WITH ADJUSTABLE SERVO LOOP GAIN

[75] Inventor: Tadafusa Tomitaka, Tokyo, Japan
[73] Assignee: Sony Corporation, Tokyo, Japan
[21] Appl. No.: 496,528
[22] Filed: Mar. 20, 1990

[30] Foreign Application Priority Data

| Mar. 24, 1989 [JP] | Japan | 1-73634 |
| Mar. 25, 1989 [JP] | Japan | 1-72961 |
| Mar. 28, 1989 [JP] | Japan | 1-75999 |

[51] Int. Cl.⁵ .......................................... G11B 15/467
[52] U.S. Cl. ............................... 360/70; 360/77.13
[58] Field of Search .......................... 360/70, 77.13

[56] References Cited

U.S. PATENT DOCUMENTS 4,319,289 3/1982 Ravizza ....................... 360/77.13

Primary Examiner—Aristotelis Psitos
Assistant Examiner—David L. Robertson
Attorney, Agent, or Firm—Lewis H. Eslinger; Jay H. Maioli

[57] ABSTRACT

A video signal is recorded in oblique tracks on a magnetic tape. The tracks are successively scanned by rotary heads, and a reproduced radio frequency signal is obtained. The level of the signal as reproduced exhibits a nonlinearity as a function of deviations of the rotary heads from the successively scanned oblique tracks. In accordance with the invention, the running speed of the tape is controlled on the basis of the detected changes in signal level, and the gain of the reproduced radio frequency signal is controlled in such a way as to compensate for the nonlinearity of the reproduced signal.

8 Claims, 6 Drawing Sheets

RF TRACKING SERVO FOR VTR WITH ADJUSTABLE SERVO LOOP GAIN

BACKGROUND OF THE INVENTION

1. Field of the Invention

The present invention relates to apparatus for reproducing a video signal and, more particularly, to a servo circuit of a VTR of the helical scan type.

2. Description of the Prior Art

As a tracking control system for use in a helical scan type VTR, a number of different systems are known. In one such system, a control signal or CTL signal is recorded on a track in the longitudinal direction of a magnetic tape. In another such system, four pilot signals having predetermined frequency differences with respect to one another are recorded on the tape. However, in all such conventional systems, the circuitry is quite complicated. This causes manufacturing costs to be higher than is desirable. For example, in systems using a CTL signal, a fixed head for recording and reproducing the CTL signal is necessary. This not only represents additional cost, it also reduces the recording density that can be achieved on the tape, since a significant amount of tape must be devoted to the CTL signal.

To solve such problems, there have been proposed tracking control systems in which the recording of a special signal for purposes of tracking control becomes unnecessary. Such tracking control systems are based on special processing of the reproduced RF signal. A so-called dynamic tracking system is representative of tracking control systems based on special processing of the reproduced RF signal. However, even in a dynamic tracking system, a voltage-dependent mechanical transducer such as a piezoelectric bimorph and a drive circuit are needed. Thus the construction is complicated and the manufacturing costs are inordinately increased.

Japanese patent application No. 63-241366, assigned to the assignee of the present invention, discloses a magnetic recording and reproducing apparatus in which tracking control is carried out in response to the level of the reproduced RF signal plus information relating to the accelerating or decelerating state of the magnetic tape.

However, in the tracking control system as disclosed in that patent application, no compensation is made for the nonlinear characteristics of the level of reproduced RF signal as a function of track deviation (i.e., as a function of deviation between the location of the reproducing head and the location of the previously recorded track). Thus even that system is not ideally suited to achieving stable tracking control.

FIG. 1 illustrates the nonlinear characteristics of the reproduced RF signal level as a function of track deviation. In FIG. 1, assuming that the reproduced RF signal level corresponding to a predetermined track deviation is required to be amplified, the gain must be larger at point 50A than, for example, at point 50B.

A drive amplifier to drive a motor as one of the elements for setting the gain of a servo system is provided in a servo loop. Since the gain corresponding to point 50A is large, the gain of the drive amplifier can be relatively small. On the other hand, since the gain corresponding to point 50B is small, the gain of the drive amplifier must be relatively large.

Therefore, if the gain of the drive amplifier is matched with the level at point 50A, the gain of the servo system may be so small at point 50B that an off-track indication occurs. On the other hand, if the gain of the drive amplifier is matched with the level at point 50B, the gain of the servo system may be so large at point 50A that an oscillation occurs. The servo characteristics thus deteriorate, and it is difficult to carry out the tracking control in a manner that is stable and reliable.

OBJECTS OF SUMMARY OF THE INVENTION

An object of the invention is to provide apparatus for reproducing a video signal in such a manner as to carry out stable tracking control.

It is also an object of the invention to do so by means of apparatus that can be easily and inexpensively manufactured.

Another object of the invention is to provide apparatus for reproducing a video signal wherein a periodic change in tape speed does not cause harmful speed fluctuations of the rotary heads.

Another object of the invention is to provide apparatus for recording a video signal that can compensate for the relatively large G forces produced in the apparatus when it is employed by a photographer who is running or on a moving vehicle, for example.

In accordance with one aspect of the invention, there is provided apparatus for reproducing a video signal recorded on a tape in successive oblique tracks, the apparatus comprising: means for advancing the tape; rotary heads for scanning the tracks successively to form a reproduced radio frequency signal, there being a possible scanning deviation of the heads from successively scanned tracks and the reproduced signal having a level that exhibits a nonlinearity as a function of the deviation; signal level detecting means for detecting a change in the level of the reproduced signal and producing an output signal indicative of the change; means for controlling the speed of advance of the tape so as to maximize the level of the reproduced signal; and gain correcting means responsive to the reproduced signal for controlling the gain to compensate for the nonlinearity.

In accordance with another aspect of the invention, there is provided apparatus for reproducing a video signal recorded on a tape in successive oblique tracks, the apparatus comprising: means for advancing the tape; rotary heads for scanning the tracks successively to form a reproduced radio frequency signal, there being a possible scanning deviation of the heads from successively scanned tracks and the reproduced signal having a level that exhibits a nonlinearity as a function of the deviation; means for generating a vibration signal for periodically changing the speed of advance of the tape; means for producing an envelope signal corresponding to the reproduced signal; means for synchronously detecting the vibration signal and the envelope signal to produce a deviation signal corresponding to the deviation and for mixing the deviation signal and the vibration signal; and means for controlling the speed of the rotary heads in response to the vibration signal so as substantially to eliminate speed fluctuations of the heads caused by a periodic change in the tape speed.

In accordance with another aspect of the present invention, there is provided apparatus for recording a video signal in successive oblique tracks on a tape, there being possible G forces acting on the apparatus during the recording and the apparatus comprising: means for advancing the tape; rotary heads for scanning the tape along successive oblique paths to form a recorded signal; speed servo means for rotating the rotary heads at a predetermined speed; and switching means for supplying a gain to the speed servo means that has a relatively small value in the absence of relatively large G forces and a relatively large value in the presence of relatively large G forces.

The preceding and other objects, features and advantages of the present invention will become readily apparent from the following detailed description of the preferred embodiments thereof, which is to be read in conjunction with the accompanying drawings.

DESCRIPTION OF THE PREFERRED EMBODIMENTS

A first embodiment of the present invention will be described hereinbelow with reference to FIGS. 2 to 6.

Figure 2:
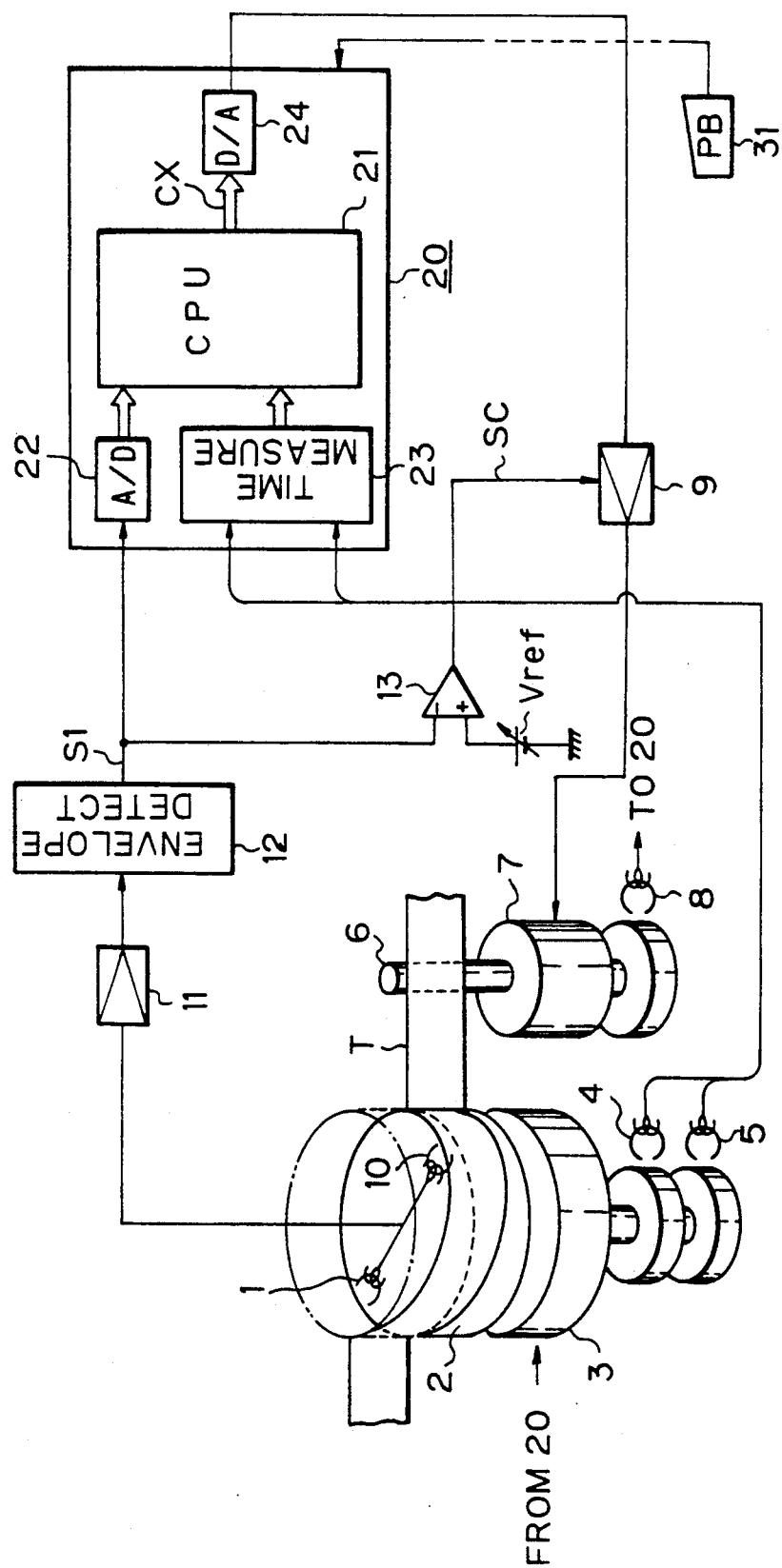
FIG. 2 is a block diagram showing a first embodiment of the present invention.

In FIG. 2, magnetic heads 1 and 10 are attached to a rotary drum 2 and driven by a motor 3 that is directly coupled thereto. A rotational phase pulse generator or PG 4 and a frequency signal generator or FG 5 are coupled to the motor 3.

The running speed of a magnetic tape T wound around the rotary drum 2 over a predetermined arc is controlled by a capstan 6. A motor 7 is directly coupled to the capstan 6, and an FG 8 is coupled thereto.

A reproduced RF signal is supplied from the magnetic heads 1 and 10 through an amplifier 11 to an envelope detector 12, and an envelope signal S1 is generated. The envelope signal S1 is supplied both to one terminal of a comparator 13 and to a digital servo control circuit 20.

Figure 1:
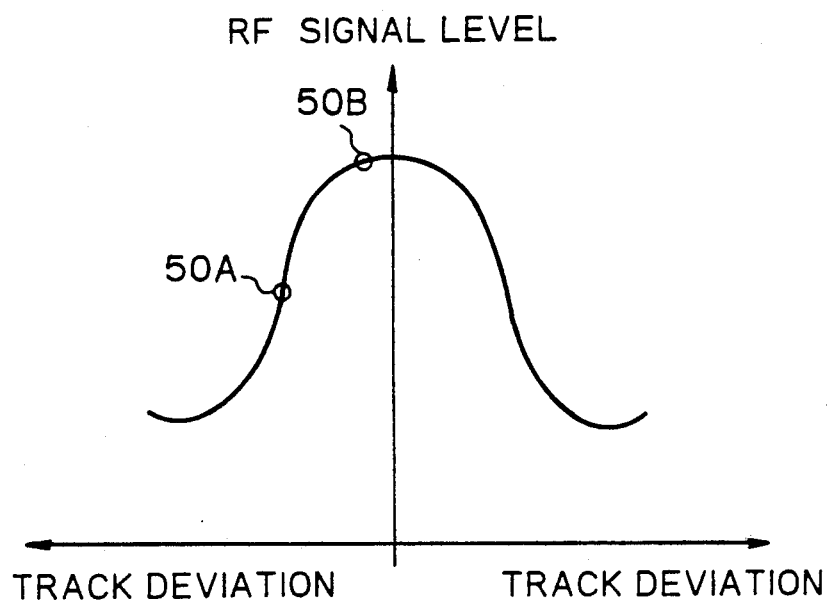
FIG. 1 is a schematic diagram for explaining the operation of a conventional servo circuit.
Figure 4:
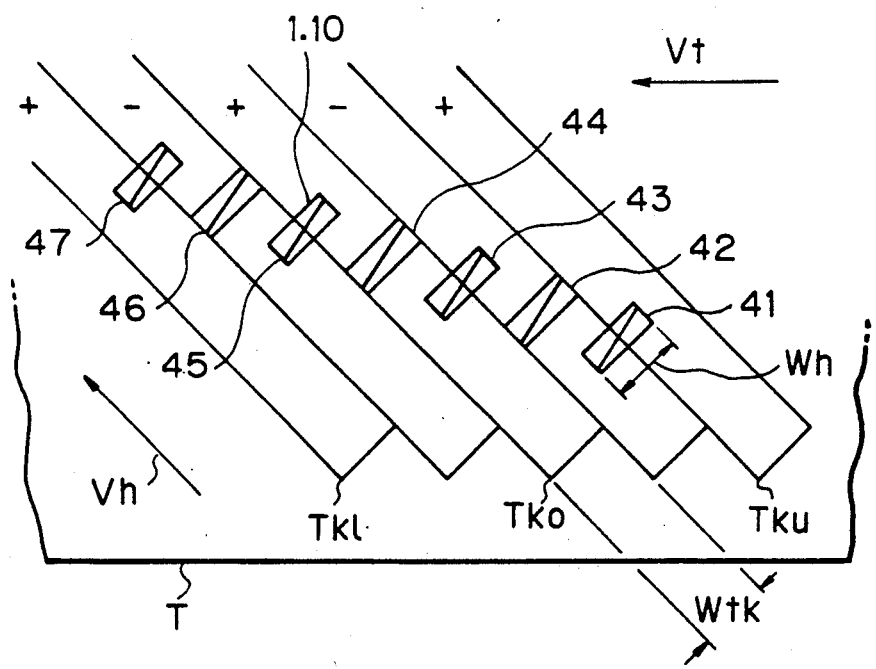
FIG. 4 is a schematic diagram showing typical tracking states of the apparatus of FIG. 2.
Figure 5:
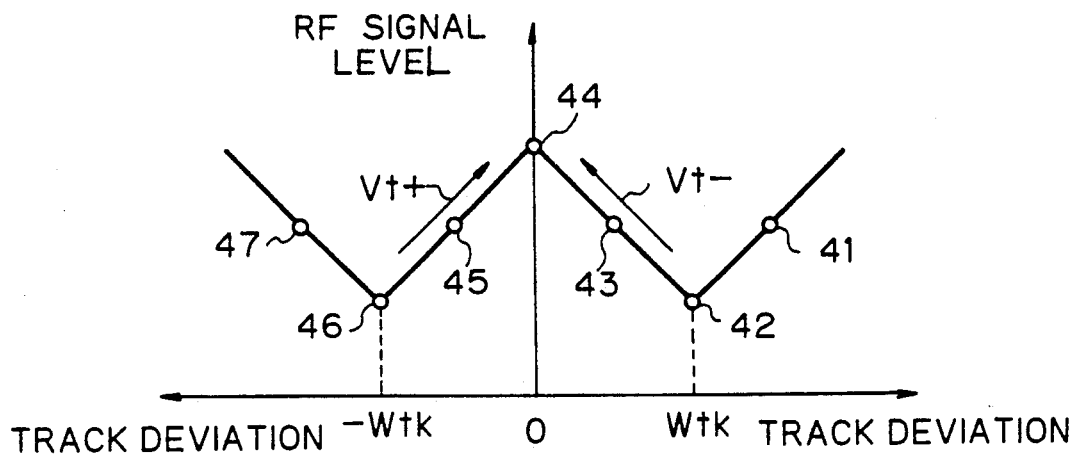
FIG. 5 is an idealized schematic diagram showing the reproduced RF signal level as a linear function of track deviation.

FIGS. 4 and 5 show an idealized relation between the tracking of the magnetic heads 1 and 10 and the reproduced RF signal level. FIG. 5 shows an ideal linear dependence of the RF signal level on track deviation; in FIG. 6, the RF signal level (shown in a heavy solid line) actually varies nonlinearly as a function of track deviation.

The width Wh (FIG. 4) of each of the magnetic heads 1 and 10 is set to be equal to the track width Wtk. As FIG. 4 shows, the relative positions between the magnetic heads 1 and 10 and tracks are represented by the following states.

State 41 in which a track Tku on the upstream side having the same azimuth (represented as "+") as that of a target track Tko is partially scanned;

State 42 in which only the track having a different azimuth (represented as "−") on the upstream side of the target track Tko is scanned;

State 43 in which the track on the upstream side of the target track Tko is partially scanned along with the target track;

State 44 in which the entire target track Tko is scanned without any track deviation;

State 45 in which the track on the downstream side of the target track Tko is partially scanned along with the target track;

State 46 in which only the track having a different azimuth on the downstream side of the target track Tko is scanned; and State 47 in which a downstream side track Tk1 having the same azimuth as that of the target track Tko is partially scanned.

The level of the reproduced RF signal from the magnetic heads 1 and 10 in each state in FIG. 4 changes as shown in FIG. 5, in which a track deviation to the upstream side corresponds to the positive direction on the horizontal axis.

In a tracking control system based on the level of the reproduced RF signal, the running speed Vt (FIGS. 4 and 5) of the magnetic tape T is increased or decreased so as to obtain state 44, in which the reproduced RF signal level becomes maximum. That is, in a case where the tracking deviates to the upstream side as shown in state 43, the running speed Vt of the magnetic tape T is decelerated as shown by an arrow Vt− in FIG. 5. On the other hand, in a case where the tracking deviates to the downstream side as shown in state 45, the running speed Vt of the magnetic tape T is accelerated as shown by an arrow Vt+ in FIG. 5. In FIG. 4, Vh denotes a track scanning speed of the magnetic heads 1 and 10.

The envelope signal S1 produced as an output by the envelope detector 12 is supplied through an A/D (analog-to-digital) converting circuit 22 to a CPU (central processing unit) 21 of the digital servo control circuit (microcomputer) 20.

Outputs of the PG 4 and FG 5 coupled to the rotary drum 2 are supplied to a timer 23 of the digital servo control circuit 20. An output of the timer 23 is supplied to the CPU 21. A tracking control output CX is supplied from the CPU 21 through a D/A (digital-to-analog) converting circuit 24 to the drive amplifier 9 that controls the capstan motor 7.

The detection output envelope signal S1 which is supplied from the envelope detector 12 is compared with a reference power source Vref by the comparator 13. When the detection output is larger than the reference power source Vref, a control signal SC of high level is supplied to the drive amplifier 9. When the detection output is smaller than the reference power source Vref, a control signal SC of low level is supplied to the drive amplifier 9. The gain of the drive amplifier 9 is controlled by the control signal SC.

Figure 6:
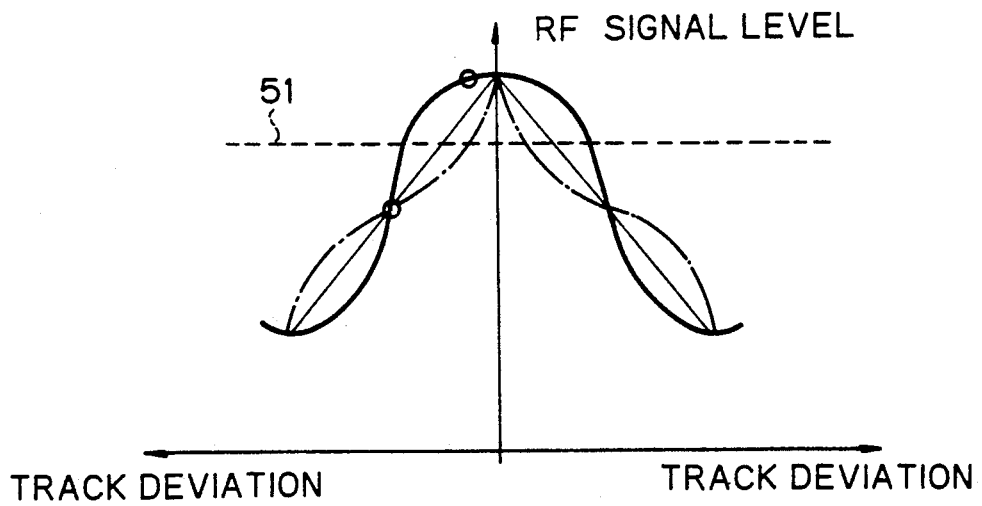
FIG. 6 is a schematic diagram showing two nonlinear components of the idealized linear function of FIG. 5.

For instance, when the reproduced RF signal level shown by the solid line in FIG. 6 has a level below that represented by a broken line 51 in FIG. 6, the gain of the drive amplifier 9 is set to a low value. When the reproduced RF signal level has a level above that represented by the broken line 51 in FIG. 6, the gain of the drive amplifier 9 is set to a high value. In this manner, the gain of the servo system is properly adjusted.

In the embodiment of the invention shown in FIG. 2, the gain of the drive amplifier 9 is set to one of two levels respectively corresponding to high and low levels of the reproduced RF signal. Of course, the invention is not limited to such an embodiment; the gain can also be set to one of three levels or one of any number of levels. It is in fact possible to construct the apparatus in a manner such that data to correct for the nonlinear characteristics of the reproduced RF signal level (shown by the solid line in FIG. 6) are stored in a ROM (read-only memory) and the nonlinear characteristics are continuously corrected on the basis of such data. The data used for such a correction are represented in FIG. 6 by a broken line formed by alternating long and short dashes.

The tracking control output CX as converted to analog form by the D/A converting circuit 24 is amplified with a predetermined gain by the drive amplifier 9 and supplied to the capstan motor 7.

An output of the FG 8 associated with the capstan 6 is supplied to the digital servo control circuit 20, and ordinary capstan servo control is carried out. An output of the digital servo control circuit 20 is supplied to the motor 3 and ordinary drum servo control is carried out.

Figure 3:
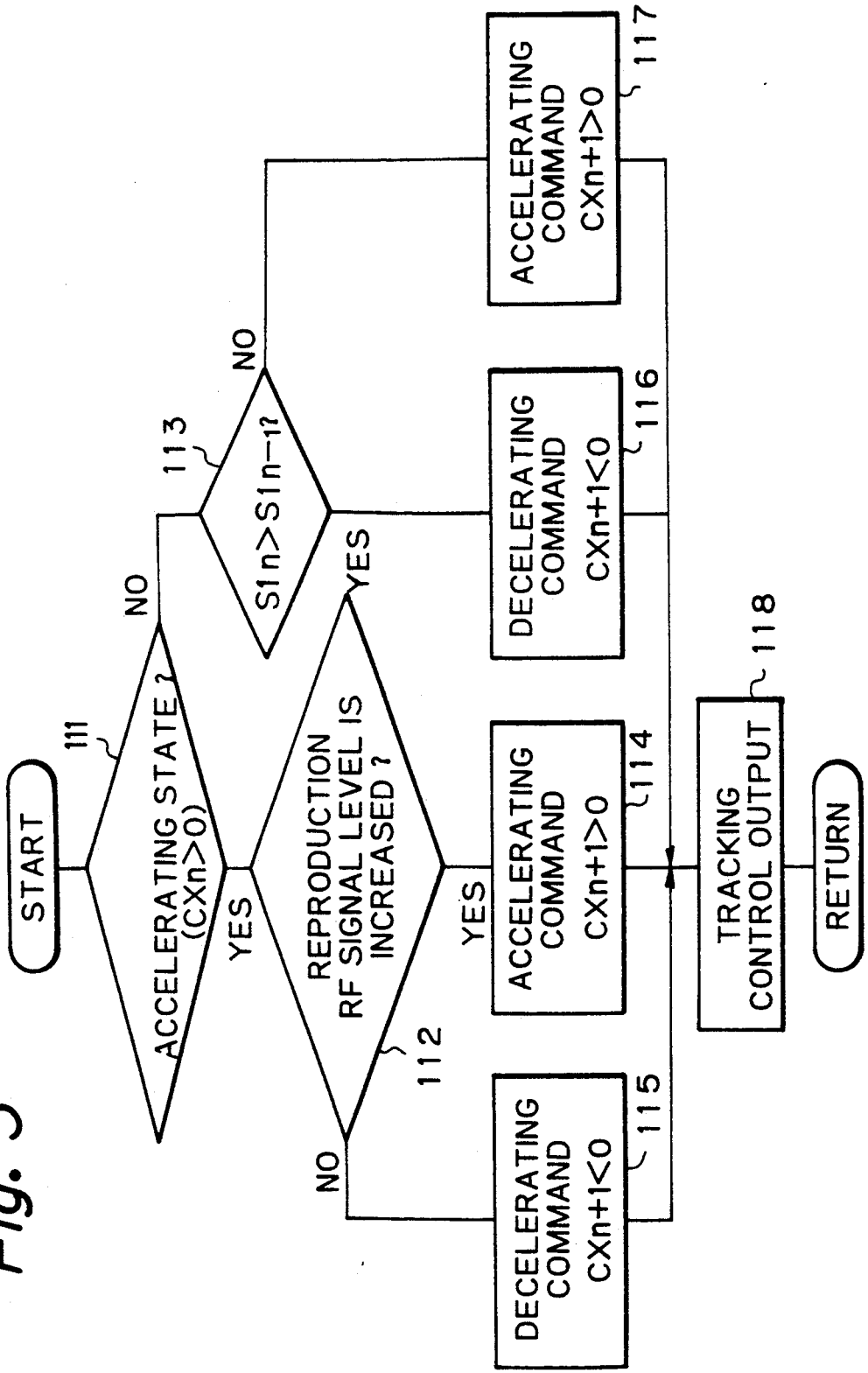
FIG. 3 is a flowchart for explaining the operation of the apparatus of FIG. 2.

The tracking servo operation will be described hereinbelow with reference to the flowchart of FIG. 3.

When a playback button 31 (FIG. 2) is operated and the VTR is set into the reproducing mode, the CPU 21 determines whether or not the magnetic tape T is being accelerated: that is, whether or not the tracking control output CXn in the present field is positive. This determination is made on the basis of the PG pulse from the PG 4, for instance, once every field (step 111).

Next, depending on the determination made at step 111, a check is made to see whether or not the reproduced RF signal level in the present field has increased as compared with the reproduced RF signal level in the preceding field: that is, the magnitudes of outputs S1n and S1n−1 in the present and preceding fields of the envelope detector 12 are compared (steps 112 and 113).

On the basis of the results of the determinations made in steps 111 to 113, the tracking condition is divided into four states. The tracking control output CX from the CPU 20 corresponding to each state is given below.

In the case where the magnetic tape T is being accelerated and the reproduced RF signal level is increasing, the magnetic heads 1 and 10 are known to be in the tracking state 45 shown in FIGS. 4 and 5, and they are being controlled in a stabilizing direction. Therefore, a tracking control output CXn+1>0 of a positive polarity for acceleration is supplied as an output so that the magnetic heads 1 and 10 are subsequently controlled in the same direction (step 114).

In the case where the magnetic tape T is being accelerated and the reproduced RF signal level is decreasing, the magnetic heads 1 and 10 are known to be in the tracking state 43 shown in FIGS. 4 and 5, and the magnetic heads 1 and 10 are being controlled in a direction opposite to the stabilizing direction.

Therefore, a tracking control output CXn+1<0 of a negative polarity for deceleration is supplied as an output so that the magnetic heads 1 and 10 are subsequently controlled in the stabilizing direction (step 115).

In the case where in the magnetic tape T is being decelerated and the reproduced RF signal level is increasing, the magnetic heads 1 and 10 are known to be set in the tracking state 43 shown in FIGS. 4 and 5, and the magnetic heads 1 and 10 are being controlled in a stabilizing direction. Therefore, the tracking control output CXn+1<0 of a negative polarity for deceleration is supplied as an output so that the magnetic heads 1 and 10 are subsequently controlled in the same direction (step 116).

In the case where the magnetic tape T is being decelerated and the reproduced RF signal level is decreasing, the magnetic heads 1 and 10 are known to be set in the tracking state 45 shown in FIGS. 4 and 5, and the magnetic heads 1 and 10 are being controlled in a direction opposite to the stabilizing direction. Therefore, the tracking control output CXn+1>0 of a positive polarity for acceleration is supplied as an output so that the magnetic heads 1 and 10 are subsequently controlled in the stabilizing direction (step 117).

The error signal generated at step 118 in accordance with the appropriate tracking control outputs CX in steps 114 to 117 is supplied to the drive amplifier 9 for the capstan motor 7.

The error signal thus supplied is amplified by the drive amplifier 9 in which the gain has been properly adjusted in accordance with the reproduced RF signal level and supplied to the motor 7. The track deviation is thus corrected.

As mentioned above, since the accelerating or decelerating state of the magnetic tape T and the increase or decrease in the reproduced RF signal level are respectively detected and the running speed of the magnetic tape T is controlled on the basis of both of the detected results, a very accurate tracking control can be carried out, even though the apparatus is of simple construction and can be manufactured at low cost.

In accordance with the invention, the increase or decrease in the reproduced RF signal level is detected, and the running speed of the magnetic tape T is controlled on the basis of the result of the detection. Further, the nonlinear characteristics of the change in reproduced RF signal level are corrected, and the gain of the drive amplifier 9 is adjusted accordingly. Therefore, stable tracking control can be carried out.

Although the apparatus has been described as reacting only to the polarity of the tracking control output CX, the invention is not limited to such an embodiment. For instance, it is also possible to construct the apparatus in a manner such that the maximum value of the reproduced RF signal level which has previously been stored is employed as a reference value and the amplitude of the tracking control output CX can be determined in accordance with the difference between the reference value and the reproduced RF signal level. Or, the polarity may be made different at a predetermined amplitude, such as +0.1 V and −0.1 V.

Moreover, the invention can be similarly applied to a digital audio tape recorder of the helicalscan type.

Further, although magnetic heads 1 and 10 each having the same width as the track width Wtk (FIG. 4) are used in the apparatus of FIG. 2, magnetic heads having widths greater than the track width Wtk can optionally be used. In that case, a tracking control system as disclosed in Japanese laid-open patent publication No. 62-222459 may be employed.

Another embodiment of the invention will now be described, which is an improved dynamic tracking system.

In a dynamic tracking system, the tape speed is periodically changed by supplying a vibration signal of a few Hz to tens of Hz to a capstan motor, the magnetic head relatively vibrates (wobbles) in the width direction of the track, and an envelope of the reproduced RF signal is obtained wherein there are periodic changes. By synchronously detecting the vibration signal and the envelope of the reproduced RF signal, tracking control is carried out. However, there is the problem that the vibration of the magnetic tape (i.e., the fluctuation of the tape speed) is propagated to the rotary drum. Therefore, jitter occurs, and the quality of the reproduced image deteriorates. This second embodiment of the invention can prevent the vibration of the magnetic tape from being harmfully propagated to the rotary drum.

Figure 7:
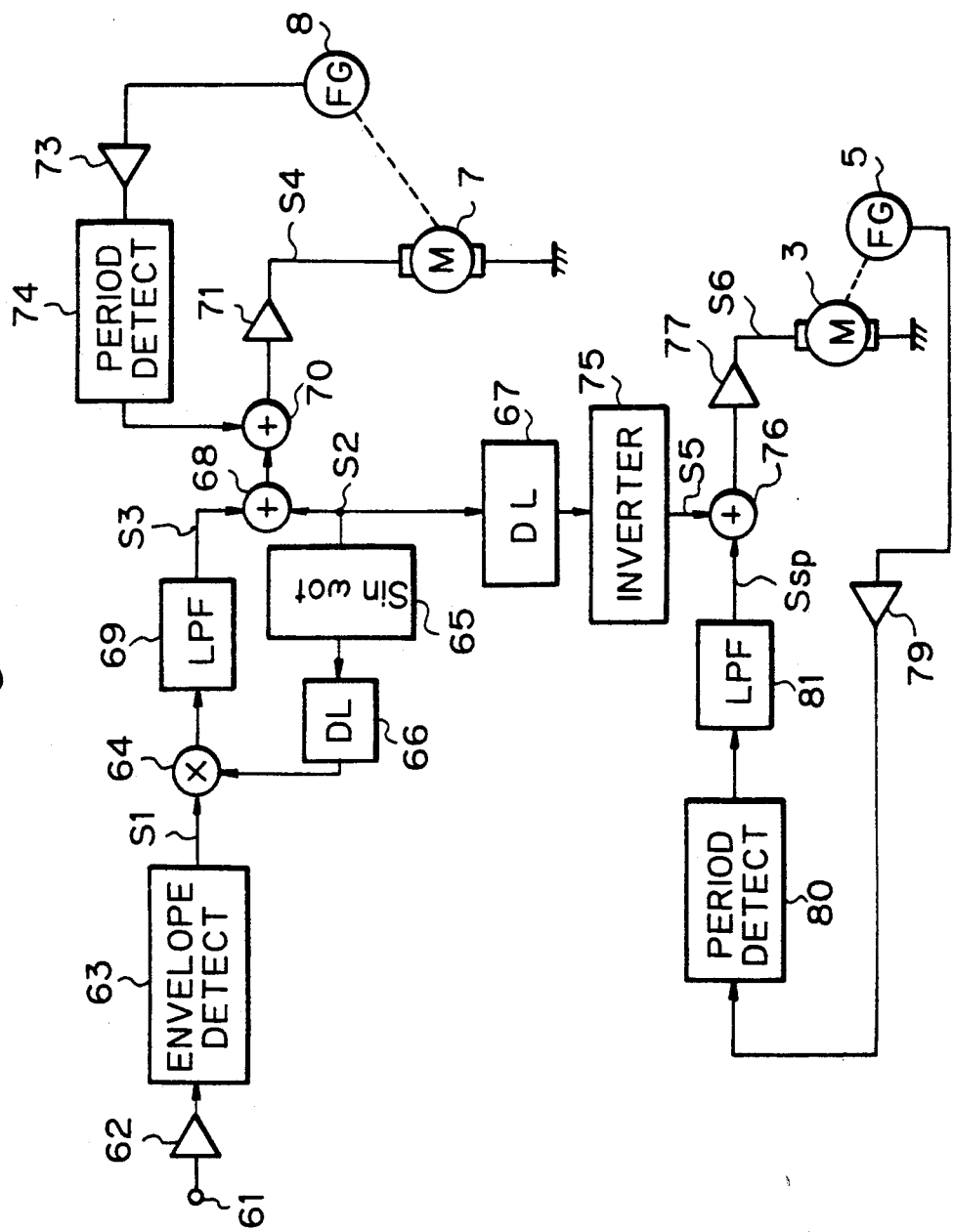
FIG. 7 is a block diagram showing another embodiment of the present invention.
Figure 8:
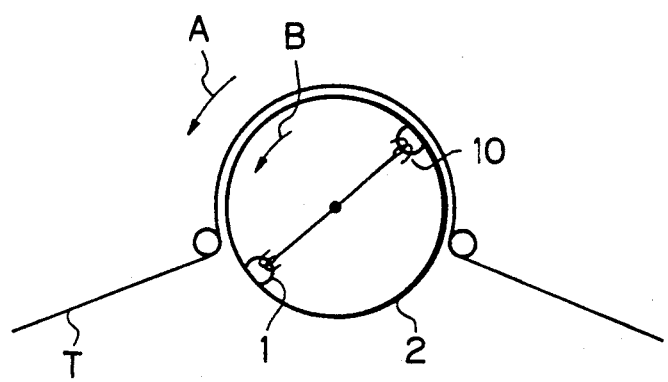
FIG. 8 is a schematic diagram for explaining the embodiment of FIG. 7.

The second embodiment of the invention is shown in FIG. 7. A reproduced RF signal obtained in a head-tape system similar to the one employed in the embodiment described above is supplied to an input terminal 61. The reproduced RF signal including an error component $\Theta(t)$ corresponding to a track deviation is supplied through an amplifier 62 to an envelope detecting circuit 63. The direction of movement of the magnetic tape T is shown by an arrow A in FIG. 8 and is set to be identical to the direction of rotation (shown by an arrow B in FIG. 8) of a rotary drum 2.

An envelope of the reproduced RF signal is detected by the detecting circuit 63, and an envelope signal S1 is derived as a detection output which is expressed by $(\sin(\omega_0 t + \Theta(t)))$. The envelope signal S1 is supplied to a multiplying circuit 64.

A vibration signal S2 of a low frequency which is expressed by $(\sin \omega_0 t)$ is supplied from a vibration signal generating circuit 65 to delay circuits 66 and 67 and an adding circuit 68. The delay circuits 66 and 67 are provided to compensate for time delays of a capstan motor 7 and a drum motor 3, respectively. Since the inertia of the drum motor 3 is larger than the inertia of the capstan motor 7, the delay amount of the delay circuit 67 is set to be larger than the delay amount of the delay circuit 66.

In the multiplying circuit 64 to which the envelope signal S1 and the vibration signal S2 are supplied, synchronous detection is executed. That is, $$\sin\omega_0 t \times \sin(\omega_0 t + \Theta(t)) = (\tfrac{1}{2})[\cos(-\Theta(t)) - \cos(2\omega_0 t + \Theta(t))] \quad (1)$$

The envelope signal S1 and the delayed vibration signal S2 are multiplied by the multiplier 64, so that the detection output which is expressed by the right side of equation (1) above is supplied to a low pass filter 69.

The second item $(\cos(2\omega_0 t + \Theta(t)))$ in the detection output which is expressed by the right side of equation (1) corresponds to harmonics that are caused by the synchronous detection. The harmonics are eliminated by the low pass filter 69. Only the component of the remaining first item $(\tfrac{1}{2})(\cos(-\Theta(t)))$ in the right side is supplied to the adding circuit 68 as a signal S3 indicative of the detection output.

The signal S3 which is supplied from the low pass filter 69 and the vibration signal S2 which is supplied from the vibration signal generating circuit 65 are added by the adding circuit 68. Thus the signal S3 which has an error component $\Theta(t)$ and is expressed by $(\tfrac{1}{2})\cos(-\Theta(t))$ and the vibration signal S2 are added, and the resultant signal is supplied to an adding circuit 70 at the next stage.

The sum of the signal S3 and the vibration signal S2 is produced as an output by the adding circuit 68. This sum and an error signal which is supplied from a period detecting circuit 74 are supplied to an adding circuit 70 (the error signal is explained below). The adding circuit 70 adds these signals to produce a control signal S4. The control signal S4 is supplied to the capstan motor 7 through a drive amplifier 71. The capstan motor 7 is controlled by the control signal S4.

A frequency signal generator (FG) 8 is coupled to the capstan motor 7. An output signal from the FG 8 is supplied to the period detecting circuit 74 through an amplifier 73.

The period of the output signal from the FG 8 is detected by the period detecting circuit 74. An error signal having a level corresponding to the detected period is formed. The error signal is supplied to the adding circuit 70.

In the capstan servo system described above, the rotational speed of the capstan motor 7 is controlled by the control signal S4. That is, the rotational speed of the capstan motor 7 is periodically changed on the basis of the vibration signal S2, and the track deviation expressed by the error component $\Theta(t)$ is controlled so as to be canceled.

On the other hand, the vibration signal S2 which is expressed by $(\sin \omega_0 t)$ is supplied from the delay circuit 67 to an inverting circuit 75. The inverting circuit 75, by inverting the phase of the delayed vibration signal S2, forms a vibration signal S5. The vibration signal S5 is supplied to an adding circuit 76.

The adding circuit 76 adds the vibration signal S5 and a speed error signal Ssp which is supplied from a low pass filter 81 to produce a control signal S6. The speed error signal Ssp is explained below. The control signal S6 is supplied to the drum motor 3 through a drive amplifier 77. The drum motor 3 is controlled by the control signal S6.

A frequency signal generator FG 5 is coupled to the drum motor 3. An output signal from the FG 5 is supplied through an amplifier 79 to a period detecting circuit 80. The frequency of the output signal from the FG 5 is set to be, for instance, 180 Hz when the rotational speed of the rotary drum 2 (FIG. 2) reaches a reference rotational speed.

In the period detecting circuit 80, the period of the output signal of the FG 5 is detected and a speed error signal Ssp having a level corresponding to the detected period is formed. The drum motor 3 is driven at the reference rotational speed on the average by the speed error signal Ssp. The speed error signal Ssp is supplied to the adding circuit 76 through the low pass filter 81 as mentioned above.

In a drum speed servo system comprising the drum motor 3, FG 5, period detecting circuit 80, a low pass filter 81, the rotational speed of the drum motor 3 is controlled by the control signal S6. That is, a periodic fluctuation of the rotational speed of the drum motor 3 on the basis of the vibration signal S2 is prevented.

The vibration signal S2 is included in the control signal S4 which is supplied to the capstan motor 7. The rotational speed of the capstan motor 7 is periodically changed on the basis of the vibration signal S2. Therefore, the tape speed of the magnetic tape T is periodically changed and wobbled.

On the other hand, the vibration signal S5 whose phase is opposite to that of the vibration signal S2 is included in the control signal S6 which is supplied to the drum motor 3. Therefore, the fluctuation in the rotational speed of the drum motor 3 due to the speed fluctuation in tape speed is canceled by the signal S5. It is thus possible to prevent the vibration from being propagated to the drum motor 3. Therefore, jitter and a consequent deterioration in the quality of the reproduced image can both be prevented.

As a result, even when the rotational speed of the capstan motor 7 increases and the speed of the magnetic tape T therefore also increases (FIG. 8), it is possible to prevent an increase in rotational speed of the rotary drum 2. Moreover, when the rotational speed of the capstan motor 7 decreases and the speed of the magnetic tape T decreases, it is possible to prevent a decrease in the rotational speed of the rotary drum 2.

In the embodiment of the invention described above, the direction of rotation of the rotary drum 2 substantially coincides with the direction of movement of the magnetic tape T. However, the invention is not limited to such an embodiment but can also be applied to the case where the direction of rotation of the rotary drum 2 is opposite to the direction of movement of the magnetic tape T. In this case, there is no need to employ the inverting circuit 75, since the phase of the vibration signal S2 does not need to be inverted.

In the embodiment of the invention described above, since the vibration signal is supplied to the drum motor in such a way as to cancel the speed fluctuation caused by the periodic change in tape speed, it is possible to prevent the fluctuation in the speed of the tape from being propagated to the rotary drum. Jitter is therefore prevented, and the deterioration in quality of the reproduced image that would otherwise occur is avoided.

Figure 9:
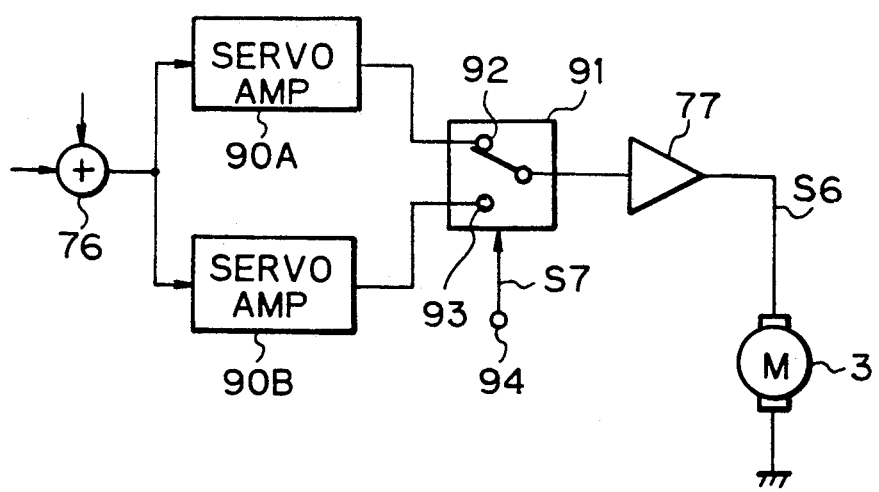
FIG. 9 is a block diagram showing a main part of still another embodiment of the present invention.

FIG. 9 shows another embodiment of the invention. For simplicity, the embodiment of FIG. 9 is described taking the control of the drum motor 3 of the embodiment of FIG. 8 mentioned above as an example.

The embodiment of FIG. 9 is suitable for a VTR integrated type camera.

VTR integrated type cameras are now widely used, sometimes under severe conditions. For instance, sometimes the camera is used by a photographer who is running, who is taking pictures through the window of a moving vehicle, or who is riding on a roller coaster, etc.

Under such conditions, it is difficult to maintain the rotational speed of a rotary drum to a reference rotational speed corresponding to a reference rotating frequency (30 Hz). This difficulty is related to the influence of gravity or inertial acceleration (hereinafter sometimes referred to as a G force) in a lateral direction.

When the gain of the drum speed servo system is raised, the suppression of the disturbance caused by the G force is improved. Therefore, it may be thought advisable to employ a fixed high level of gain for the drum speed servo system. However, in this case, the undesirable effects of mechanical or electrical manufacturing tolerances or irregularities such as eccentricity of the drum, frequency variation of the output signal from the FG, vibration of the guide, quantization error in the servo system, etc., are unduly amplified. Therefore, jitter increases even in a normal operating state in which a disturbance due to G forces hardly exists. The embodiment of FIG. 9 effectively eliminates the influence by the disturbance in a drum servo circuit.

As mentioned above, the output signal of the adding circuit 76 is used as a speed servo signal for the drum motor 3. The output signal of the adding circuit 76 is supplied to servo amplifiers 90A and 90B, respectively, as shown in FIG. 9. Although not shown, each of the servo amplifiers 90A and 90B has a phase compensating circuit. In the servo amplifiers 90A and 90B, the output signal of the adding circuit 76 is amplified by a predetermined gain and supplied to a switching circuit 91. The gains of the servo amplifiers 90A and 90B are set to Ga and Gb, respectively, where Ga > Gb.

The error signal amplified by the gain Ga is supplied from the servo amplifier 90A to a terminal 92 of a switching circuit 91. The error signal amplified by the gain Gb is supplied from the servo amplifier 90B to a terminal 93 of the switching circuit 91.

The state of the switching circuit 91 is controlled by a control signal S7 from a terminal 94. The control signal S7 is set by a manual switch which is operated by the photographer in accordance with the conditions under which the camera is being used. Under ordinary or normal photographing conditions, the control signal S7 is set to, for instance, "0" (low level). In this case, the terminal 93 of the switching circuit 91 is connected to select the relatively low gain Gb. The error signal from the servo amplifier 90B is selected by the switching circuit 91 and is provided as an output. On the other hand, under severe photographing conditions in which the G forces are high, the control signal S7 is set to "1" (high level). The terminal 92 of the switching circuit 91 is then connected to select the relatively high gain Ga. The error signal from the servo amplifier 90A is selected by the switching circuit 91 and is supplied as an output. The error signal selected by the switching circuit 91 is supplied to the drum motor 3 through an amplifier 77. In this way, the rotational speed of the drum motor 3 is effectively controlled regardless of whether or not the camera is subjected to high G forces.

Thus the suppressing characteristics of the drum speed servo system when operating under the influence of high G forces in the lateral direction are improved. The rotational speed of the rotary drum is maintained at the desired rotational speed, and the oscillation of the image resulting from jitter and the deviation of the chroma APC (automatic phase control) are prevented. A situation such that no color appears in the image is also avoided. It is possible to prevent a situation in which one horizontal period becomes so long that the synchronization is not carried out. Thus, the disturbance is eliminated, normal recording can be carried out, and a normal reproduced image can be obtained.

In addition to the switching of the servo amplifiers, the frequency of the output signal from the FG 5 can be also switched from 180 Hz in the normal mode to 720 Hz in the vibrating mode.

In the embodiment as discussed above in connection with FIG. 9, the switching circuit 91 is operated manually. However, the invention is not limited to such an embodiment. For instance, the vibration can be detected automatically by a vibration detecting sensor and the switching circuit 91 controlled in accordance with the detected result. Or, the occurrence of a disturbance can be detected automatically by measuring the phase difference between a sync signal and an FG pulse, and the switching circuit 91 can be controlled accordingly.

Moreover, the servo amplifiers 90A and 90B can be constructed as a single amplifier having a controllable gain, the gain having a value that is selected by the control signal S7.

The preferred embodiments of the present invention are described above with reference to the accompanying drawings. Of course, the invention is not limited to those precise embodiments, and various changes and modifications may be effected therein by one skilled in the art without departing from the scope or the spirit of the invention as defined in the appended claims.

I claim:

1. Apparatus for reproducing a video signal recorded on a tape in successive oblique tracks, the apparatus comprising:

means for advancing the tape;

rotary heads for scanning the tracks successively to form a reproduced radio frequency signal, there being a possible scanning deviation of the heads from successively scanned tracks and the reproduced signal having a level that exhibits a nonlinearity as a function of the deviation;

signal level detecting means for detecting a change in the level of the reproduced signal and producing an output signal indicative of the change;

means for controlling the speed of advance of the tape so as to maximize the level of the reproduced signal; and gain correcting means responsive to the reproduced signal for controlling the gain of the reproduced signal to compensate for the nonlinearity.

2. Apparatus for reproducing a video signal according to claim 1 wherein the detecting means comprises means for producing an envelope signal corresponding to the reproduced signal, means for producing a reference signal having a reference level, and comparator means for comparing the envelope signal with the reference signal.

3. Apparatus for reproducing a video signal recorded on a tape in successive oblique tracks, the apparatus comprising:

means for advancing the tape;

rotary heads for scanning the tracks successively to form a reproduced radio frequency signal, there being a possible scanning deviation of the heads from successively scanned tracks and the reproduced signal having a level that exhibits a nonlinearity as a function of the deviation;

means for generating a vibration signal for periodically changing the speed of advance of the tape;

means for producing an envelope signal corresponding to the reproduced signal;

means for synchronously detecting the vibration signal and the envelope signal to produce a deviation signal corresponding to the deviation and for mixing the deviation signal and the vibration signal; and means for controlling the speed of the rotary heads in response to the vibration signal so as substantially to eliminate speed fluctuations of the heads caused by a periodic change in the tape speed.

4. Apparatus for reproducing a video signal according to claim 3 wherein the polarity of the vibration signal depends on the direction of rotation of the rotary heads and the direction of movement of the tape.

5. Apparatus for reproducing a video signal according to claim 3 wherein the direction of rotation of the rotary heads and the direction of movement of the tape can be the same or opposite to each other and wherein the polarity of the vibration signal when the direction of rotation of the rotary heads and the direction of movement of the tape are the same is opposite to the polarity of the vibration signal when the direction of rotation of the rotary heads and the direction of movement of the tape are opposite to each other.

6. Apparatus for recording a video signal in successive oblique tracks on a tape, there being possible G forces acting on the apparatus during the recording and the apparatus comprising:

means for advancing the tape;

rotary heads for scanning the tape along successive oblique paths to form a recorded signal;

speed servo means for rotating the rotary heads at a predetermined speed; and switching means for selecting a gain to the speed servo means that has a relatively small value in the absence of relatively large G forces and a relatively large value in the presence of relatively large G forces.

7. Apparatus for recording a video signal according to claim 6 wherein the relatively large G forces are those characteristically produced when the apparatus is operated by a person who is running.

8. Apparatus for recording a video signal according to claim 6 wherein the relatively large G forces are those characteristically produced when the apparatus is operated by a person on a moving vehicle.

* * * * *